April 12, 1932.  D. D. HUNGERFORD ET AL  1,853,563
INTERNAL COMBUSTION ENGINE
Filed Feb. 8, 1928   5 Sheets-Sheet 1
Fig.1.
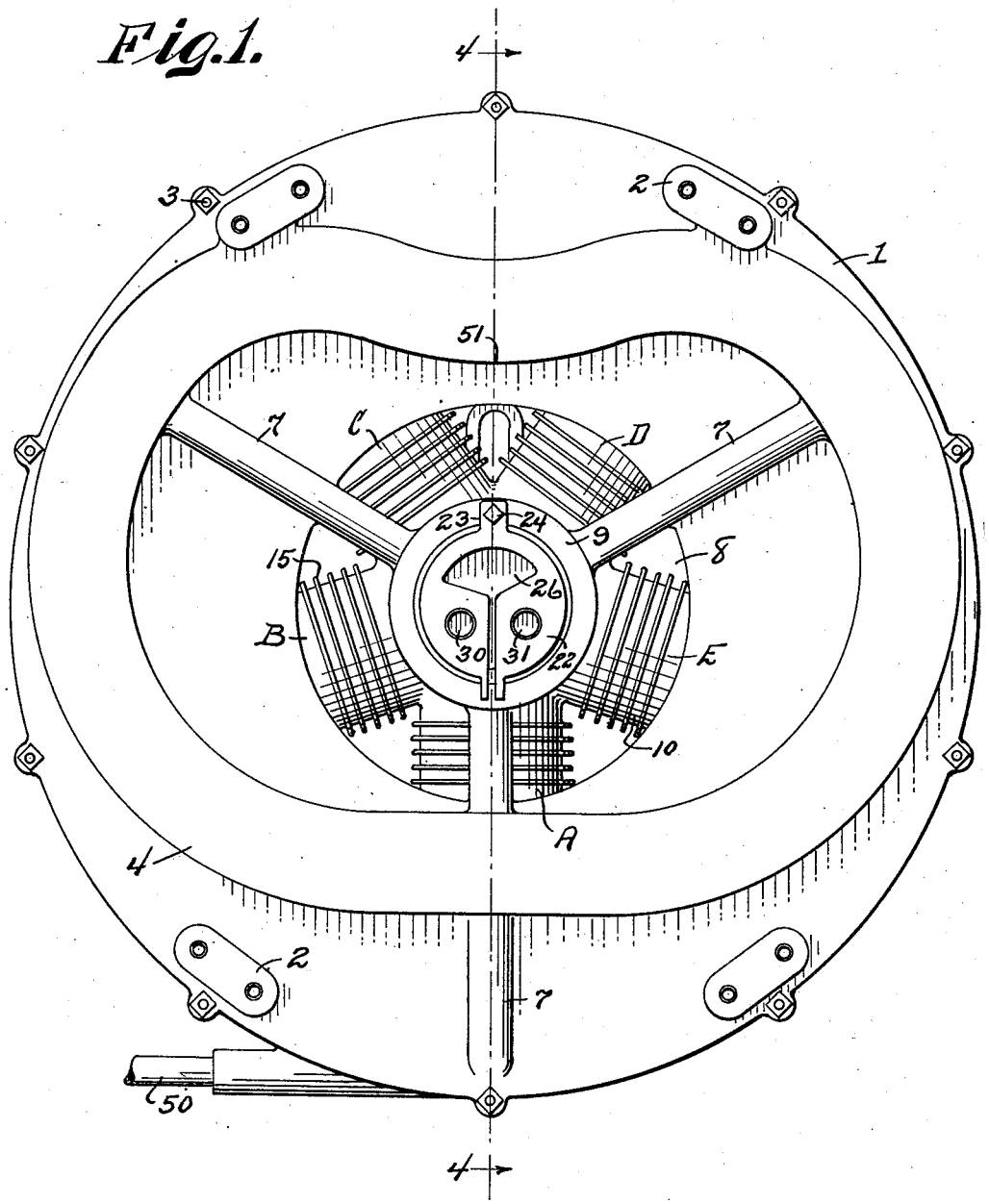
Daniel D. Hungerford,
Floyd S. Hungerford and
Amos P. Newland
INVENTORS
BY *Victor J. Evans*
ATTORNEY
WITNESS: 

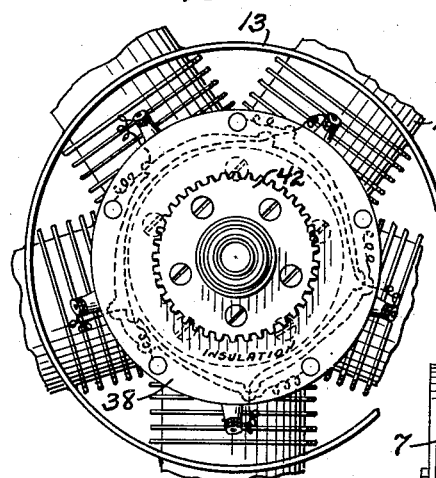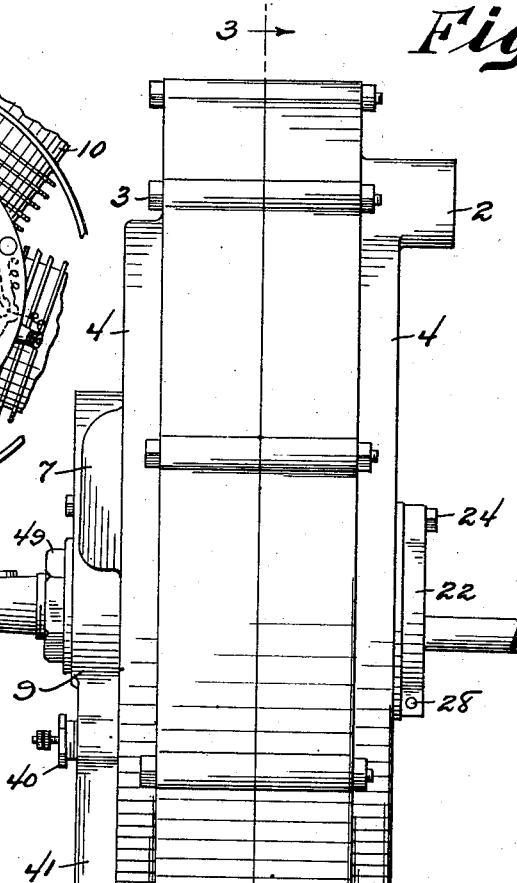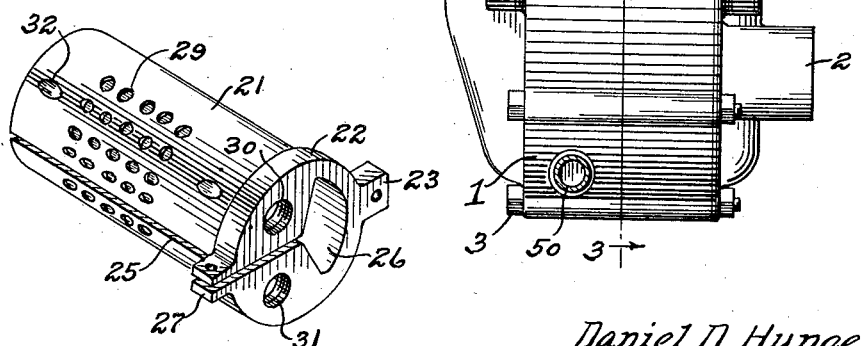

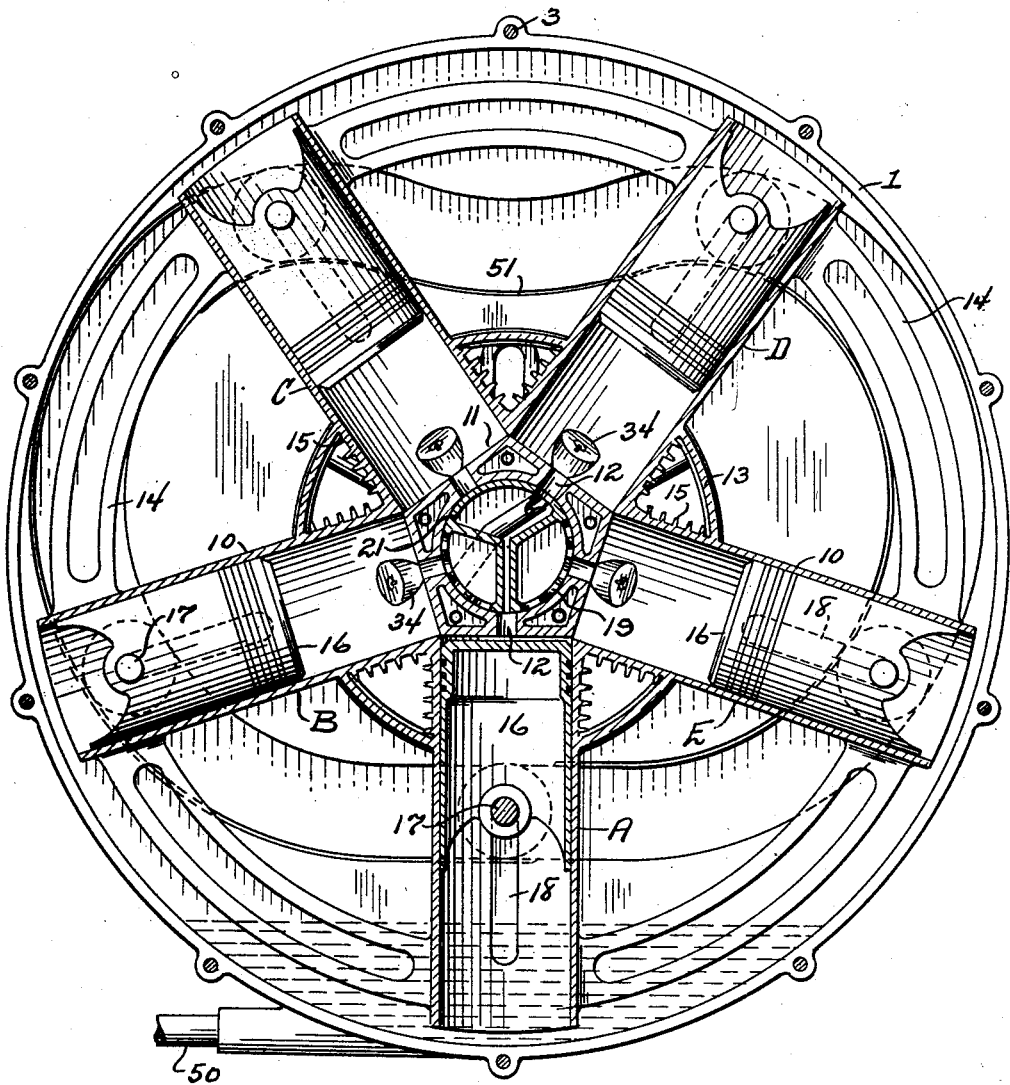

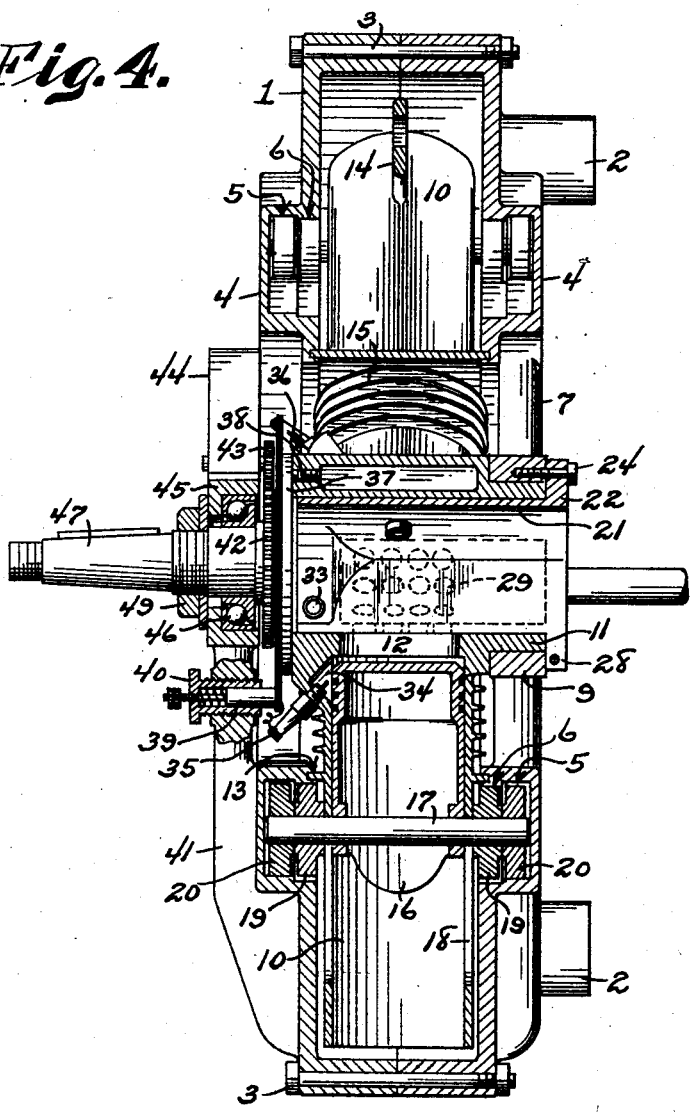

April 12, 1932.  D. D. HUNGERFORD ET AL  1,853,563
INTERNAL COMBUSTION ENGINE
Filed Feb. 8, 1928  5 Sheets-Sheet 5

Daniel D. Hungerford,
Floyd S. Hungerford and
Amos P. Newland

INVENTOR

BY Victor J. Evans
ATTORNEY

WITNESS: John Donovan

Patented Apr. 12, 1932

1,853,563

UNITED STATES PATENT OFFICE

DANIEL D. HUNGERFORD, FLOYD S. HUNGERFORD, AND AMOS P. NEWLAND, OF ELMIRA, NEW YORK

INTERNAL COMBUSTION ENGINE

Application filed February 8, 1928. Serial No. 252,811.

Our present invention has reference to internal combustion engines of the revolving cylinder and piston type which may be employed as a power plant for air-craft, automobiles or which may be likewise employed as a stationary engine for driving any other desired type of machine, and our object is to simplify and improve the existing art by providing an air cooled engine of this type in which the parts thereof are effectively lubricated, the gases will be subjected to rapid compression and expansion to insure the full power of the engine, the cylinders will be effectively scavenged and further wherein the piston displacement will equal that of an engine of the crank-shaft type but without shock or jar of reversal of motion in the moving parts.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a face view of an internal combustion engine in accordance with this invention.

Figure 2 is a side elevation thereof.

Figure 3 is a sectional view approximately on the line 3—3 of Figure 2.

Figure 4 is a sectional view approximately on the line 4—4 of Figure 1.

Figure 5 is a detail fragmentary elevation looking toward the shaft of the engine.

Figure 6 is a perspective view of the valve.

Figure 8:
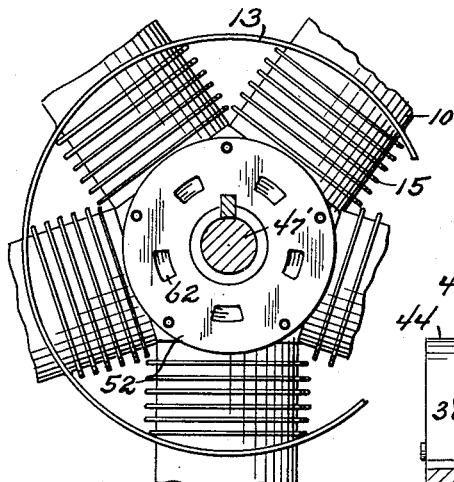
Figure 8 is a sectional view approximately on the line 8—8 of Figure 7.

In the showing of the drawings our engine is of the five cylinder type. The housing 1 is made up of two sections which are practically identical, one of the sections, however, being integrally formed with lugs or projections 2 provided with bolt openings whereby the housing or casing 1 can be fixedly secured in the fuselage of an airplane. Each of the sections constituting the housing or the casing 1 comprises a hollow member which is round in plan, the said sections being formed with transversely extending peripheral enlargements that have openings therethrough for the reception of bolts 3 which are engaged by nuts. Each of the housing sections has on its outer face a substantially elliptical, lateral, enlargement that is hollow and affords tracks 4. The inner face of the housing sections are grooved around the elliptical tracks and the opposite walls of the lateral enlargement afford the rails for the tracks.

By reference to Figure 4 of the drawings it will be seen that each of these walls of the enlargement provide two rails 5 and 6, respectively, the rails being stepped so that the rails 6, at the upper portions of the tracks project inwardly from the rails 5, while the rails 5, at the lower portion of the track, extend inwardly from the rails 6, so that the rails 5, 6 are offset. The reason for this arrangement will presently be set forth.

Both of the sections of the housing are provided with reinforcing ribs 7, three of such angularly arranged ribs extending from the lateral enlargement across a central opening 8 in the sides of the housing and being integrally connected to the hub 9 for the housing. In the housing there are arranged the connected but angularly disposed cylinders 10 of the improved engine. These cylinders, at their connected or hub portion are formed with what may be termed straight walls, or more strictly speaking walls which are arranged at a right angle at the center of the axis of the rotation of the cylinders. The connecting wall or hub for the cylinders is indicated by the numeral 11 and as disclosed by the drawings the hub, in the carbureter and exhaust side of the engine is reduced, and is arranged for rotation on the hub 9 at one side of the housing 1. The hub 11 for the cylinders is provided with ports 12 which communicate with the respective cylinders and, of course, with the bore of the hub. The cylinders, at the portions thereof disposed adjacent to the opening 8, in the sides of the housing are formed with curved webs 13, describing cylindrical flanges and these flanges are received in suitable annular grooves in the inner walls of the housing. The web 13 not only reinforces the cylinders but prevents oil picked up by the cylinders in the bottom of the casing from being forced through the openings 8 in the housing. As shown in Figs. 3 and 4 the web 3 connects the cylinders and extends from side to side thereof, forming a cylindrical guard. The outer ends of the cylinders are connected by segmental flanges 14 which for the sake of lightness have their central portions grooved or cut away.

The portions of the cylinders, inward of the connecting and reinforcing web 13 are formed with fins 15, and in each of the cylinders there is a hollow piston 16. The pistons are formed with the usual grooves for the piston rings, and each of the pistons, adjacent to its outer and open end has passed through its sides a rod or shaft 17. These shafts 17 are received through elongated slots or openings 18 in the opposite sides of the respective cylinders 10. Fixed on the respective ends of the shafts 17 there are inner and outer rollers 19 and 20, respectively, that are designed to travel on the rails 5 and 6 of the tracks 4.

Received through the end of the hub 11 that bears on the hub 9 of the housing there is the valve of the improvement. This valve is illustrated in detail in Figure 6 of the drawings. The valve comprises a cylindrical body 21 that has an outer annular head enlargement 22. The head 22 is formed with a lug extension 23, that has an opening therethrough for the reception of a bolt 24 which enters the hub 9 and holds the valve from turning. The body 21, as well as its head 22, is formed with a longitudinal slot 25 which communicates with a longitudinally arranged depressed portion forming a cooling opening 26 that also extends longitudinally through the body 21 and the head 22. Thus it will be noted that the valve 21 provides a split member and being constructed of suitable steel or like metal embodies a natural resiliency. The opposite sides of what I will term the spring valve 21 will have a tendency to move away from each other and thereby frictionally contact with the bore of the hub 11. The head 22, in a line with the slot 25 therethrough is formed with lug extensions 27, the said lugs 27 having alining openings therethrough and one or both of these openings may be threaded for coengagement with the threads of a bolt member 28 that permits of the frictional engagement between the valve and the bore of the hub being regulated.

The opposite sides of the valve 21 have longitudinally arranged chambers therein, each of which being provided with series of outlet ports 29. The head 22 is provided with threaded ports 30 and 31 which communicate respectively with the ported chambers. The ports 30 and 31 have screwed therein respectively, the fuel intake and exhaust pipes, the fuel intake pipe being connected with the carbureter in the usual manner, (not illustrated).

The body 21, at the opposite sides thereof, has other ports 32 and these ports are connected together by tubes, the object being to equalize the pressure of gas during the moment of compression and explosion within the cylinders. To assist in the spreading of the valve we arrange between the sides thereof one or more coil springs 33, (see Figure 4).

The end of the hub 11 which extends through the opening 8 in the side of the housing opposite that to which the valve is fixed is thickened or extended outwardly, and this portion, in a line with the respective cylinders 10, is formed with firing chambers 34 and the outer angle walls of these chambers have screwed therein spark plugs 35. Fixedly secured to this end of the hub 11, by fastening means 36, there is a metal disc 37, and fixedly secured on the outer face of the disc 37 there is a larger disc 38 of insulating material. This disc provides the body member of the distributor and said disc having embedded therein and extending therethrough at equidistant points contact plates to which the respective spark plugs 35 are wired. The metal discs are in the path of contact with a spring influenced brush 39 and this brush is supported in a suitable adjustable housing 40 that is screwed through an opening in a reinforcing rib 41 on this side of the housing.

The distributor 38 may surround and have fixed on the outer face thereof a toothed wheel 42 which, of course, is fixed to the disc 37, and this toothed wheel engages with a cog wheel 43 on the shaft of the magneto 44 that is suitably supported on a hollow bearing 45 provided at the upper end of the reinforcing rib 41. In the hollow bearing there is the raceway for anti-frictional balls 46, the said balls providing bearings for the inner portion of a shaft 47, the said shaft, of course, being fixed centrally on the toothed wheel 42. There is screwed on the shaft 47 a washer which is engaged by a lock nut 49.

Communicating with the lower portion of the housing 1 there is a tube or pipe 50 that is connected with a force lubricant feed, so that the lower portion of the housing has a lubricant constantly fed therein. The pipe 50 is also connected with other parts of the engine to be lubricated.

By cutting or grooving the tracks to provide the same with the rails 5 and 6 over which the rollers 19 and 20 pass, the said rollers are prevented from reversing their direction of rotation as the reciprocating motion of the pistons transfers pressure from one to the other rail. In this manner one of the rollers is at all times in contact with one of the rails. By reference to Figure 4 it will be seen that there is practically no clearance between the piston and the head or hub for the cylinder thereof, so that the cylinders will be positively scavenged in the operation of the pistons therein, and this also permits of the engine being employed as an air compressor.

The tracks 4 are substantially elliptical in shape and eccentric to the general center of the cylinder head or hub, but the said track, at the top and center thereof, is grooved downwardly, as at 51, and when a cylinder and its piston is brought opposite the central portion of this grooved portion of the track the charge is fired, and an impulse will thereby be given the rotor, which comprises the connected cylinders to cause the same to travel rapidly so that the charge in each of the cylinders will be rapidly fired, and consequently the shaft 47 will be rapidly revolved. For distinction the cylinder marked A, in Fig. 2 of the drawings, has its piston in neutral position, the cylinder marked B, is receiving a fuel intake, the cylinder marked C has its piston at its compression stroke, the cylinder marked D has just exploded its charge, and when the same reaches the position of the cylinder E the charges therefrom will be exhausted.

The particular and peculiar arrangement of the tracks permits of the rapid compression and expansion of the gases and obviates any loss of power. The torque is delivered to the cylinder a great distance from the center of the axis of radiation. The engine operates on the continuous four stroke principle affording one power impulse from each cylinder per revolution of the motor or driving shaft which is especially desirable for airplane propulsion. The air cooling fins are arranged in the cylinder where the greatest heat is developed which will retain such cylinders in cooled conditions.

Figure 7:
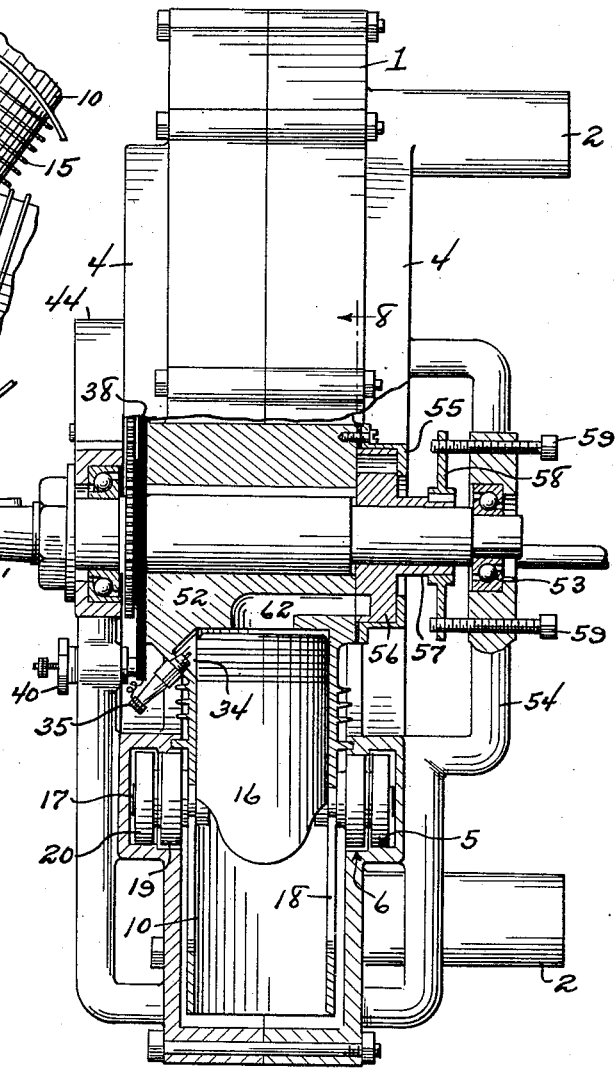
Figure 7 is a side elevation illustrating a slight modification, parts being broken away and parts in section.
Figure 9:
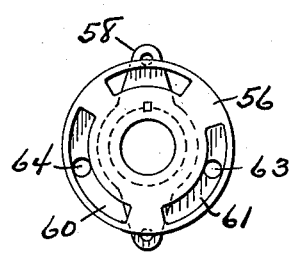
Figure 9 is a face view of the valve.

In Figures 7, 8 and 9 I have illustrated a slight modification. In these figures the ignition system is similar to that previously described, but the shaft 47' extends entirely through the head or hub 52 of the cylinder carrying rotor. In this instance, one end of the shaft 47' is mounted on anti-frictional rollers 53 whose race-ways are suitably housed in an opening in the offset web 54 of one of the housing carrying sections. A flanged plate 55 is bolted to the hub 52, and consequently revolves therewith. Received in this cover 55 and arranged around the reduced end of the shaft 47' there is the valve 56. In this instance the valve has a hub extension 57 whose outer end is surrounded and has keyed thereon a plate or arm 58 that has threaded openings therethrough, and screwed through threaded openings in the rib 54 and through the last mentioned openings, there are bolts 59, the adjustment of these bolts regulating the valve with respect to its contact with the hub 52 of the rotor. The valve is provided on its inner face with arcuate chambers 60 and 61 which are designed to communicate with the ports 62 in the hub 52 of the cylinder carrying rotor, and the passages 60 and 61 are provided with ports 63 and 64 in which are screwed respectively the intake and exhaust pipes.

Having described the invention, we claim:

1. In an internal combustion engine, a valve adapted to be supported by the engine frame and having intake and exhaust ports, and the valve being of split spring metal and thus having a resiliency for causing it to fit the hub of the rotor, and adjusting means connecting the portions of the valve at opposite sides of its split.

2. In an internal combustion engine, a valve adapted to be supported by the engine frame and having intake and exhaust ports, and the valve having a resiliency for causing it to snugly fit the hub of the rotor, and means for adjusting the valve as to its resiliency.

In testimony whereof we affix our signatures.

DANIEL D. HUNGERFORD.
FLOYD S. HUNGERFORD.
AMOS P. NEWLAND.